2,942,936

AMMONIA MANGANESE CARBONYL HALIDE AND PROCESS FOR PRODUCING

Thomas H. Coffield, Farmington, and Normand Hebert, Detroit, Mich., assignors to Ethyl Corporation, New York, N.Y., a corporation of Delaware No Drawing. Filed Aug. 23, 1957, Ser. No. 680,024

6 Claims. (Cl. 23—14)

The present invention relates to metallic carbonyl compounds and more particularly to certain novel nitrogen-containing manganese carbonyl halide compounds and to a process for their preparation.

It is an object of this invention to provide certain novel manganese carbonyl halide compounds. A more specific object is to provide nitrogen-containing manganese carbonyl halide compounds. A further object is to provide a method for the preparation of ammonia manganese carbonyl halide compounds. Other objects will become apparent from the specification which follows.

The objects of this invention are accomplished by an ammonia manganese carbonyl halide compound wherein the halogen has an atomic number of at least 17. Novel compounds of this invention are represented by the formula;

$$(NH_3)_a Mn(CO)_b X$$

where $a$ is a small integer ranging from 1 to 3, $b$ is a small integer ranging from 3 to 4 such that the total of $a$ plus $b$ is from 5 to 6, and X represents a halogen with an atomic number of at least 17, i.e. chlorine, bromine or iodine.

The novel compounds of this invention have been found to be extremely useful intermediates in the preparation of cyclopentadienyl manganese tricarbonyl compounds. The ammonia manganese carbonyl halide compounds of this invention also have other uses, for example, as an aid in the drying of certain drying oils that are film forming on exposure to air.

The ammonia manganese carbonyl halide compounds of this invention are prepared by a novel process which comprises reacting ammonia with a manganese pentacarbonyl halide wherein the halogen has an atomic number of at least 17. This process is conveniently carried out under a variety of conditions ranging from atmospheric pressure and low temperatures to elevated temperatures and pressures up to the critical point of ammonia. Thus when a manganese pentacarbonyl halide is contacted with liquid ammonia at atmospheric pressure and the mixture is subsequently warmed to above the boiling point of ammonia, ammonia manganese tetracarbonyl halides are produced. When the process is conducted at elevated temperatures under pressure, ammonia manganese tricarbonyl halides are produced.

The novel ammonia manganese carbonyl halide compounds of this invention are ionic or covalent compounds depending upon the particular combination of ammonia and carbonyl groups which they contain. Thus, when the sum of the subscripts $a$ and $b$ in the above generic formula is 5, the compounds of this invention are non-ionic amorphous solids which are soluble in acetone, very soluble in the lower alkyl alcohols and slightly soluble in water. When the sum of the subscripts $a$ and $b$ in the above formula is 6, the novel compounds of this invention are ionic and are crystalline solids which may be re-crystallized from water and are soluble in methyl alcohol, but insoluble in acetone. The ionic compounds have no definite melting point but decompose in air at elevated temperatures. A preferred embodiment of this invention comprises compounds of the above formula where $b$ is 4, that is, compounds having the formula $(NH_3)_2 Mn(CO)_4 X$ where $a$ and X are defined above. Of these, the mono ammonia manganese tetracarbonyl halides are preferred as they are readily prepared from ammonia and a manganese pentacarbonyl halide.

In conducting the process of this invention the manganese pentacarbonyl halide may be employed in the pure state or may be contained in an inert diluent such as a liquid hydrocarbon (either aliphatic or aromatic), a halohydrocarbon or an alcohol. However, excellent results are obtained when no solvent is employed and the ammonia is reacted directly with the manganese pentacarbonyl halide.

The separation procedure employed in recovering the compounds of this invention in their pure state depends to a great extent on whether the particular compound desired is ionic or covalent as explained above. The ionic compounds are conveniently isolated by extraction of the reaction mixture with acetone. Whereupon the desired product remains in the residue and is conveniently recrystallized from water. The non-ionic compounds can be recrystallized from the acetone extract of the reaction product.

The manganese pentacarbonyl halide compounds used as starting material in the above process of this invention can be prepared by direct halogenation of manganese pentacarbonyl in a solvent such as $CCl_4$. Manganese pentacarbonyl, which exists as the dimer having the formula $[Mn(CO)_5]_2$ is prepared by one of several known processes among which is the reaction of carbon monoxide with an intermediate prepared from a phenyl Grignard reagent and a manganese halide.

The following specific examples in which all parts and percentages are by weight are illustrative of the compounds of this invention and the processes for their preparation.

Example I

Twenty parts of manganese pentacarbonyl bromide were dissolved in 165.4 parts of liquid ammonia. The ammonia was slowly evaporated. The product residue was extracted with acetone, leaving an acetone insoluble white solid which consists of ammonium bromide and the diammonia manganese tetracarbonyl bromide. The acetone was evaporated and the resulting product was triturated with petroleum ether. Seventeen parts of ammonia manganese tetracarbonyl bromide $$[(NH_3)Mn(CO)_4 Br]$$

was obtained corresponding to an 87.5 percent conversion based on manganese pentacarbonyl bromide. Elemental analysis showed the compound to contain 20.8 percent manganese, which corresponds exactly to the calculated content for ammonia manganese tetracarbonyl bromide. Ammonia manganese tetracarbonyl bromide is a yellow solid having a melting point of 85° C.

Example II

Manganese pentacarbonyl bromide (5 parts) was charged to a pressure resistant vessel equipped with stirring means, heating means, cooling means and a temperature measuring device. The vessel was sealed and cooled to about −60° C. and ammonia was admitted. The vessel was warmed to obtain a total pressure of 500 pounds and a temperature of 70° C. The reaction mixture was maintained under these conditions for 1 hour. After this time the vessel was cooled, vented and the ammonia allowed to evaporate. A yellow crystalline solid, triammonia manganese tricarbonyl bromide was separated from the reaction mixture. This compound does not melt, but decomposes on heating at about 190° C. to form manganous bromide and manganese pentacarbonyl. The calculated composition of this compound is 13.31 percent carbon, 3.37 percent hydrogen, 20.38 percent manganese and 15.6 percent nitrogen. Elemental analysis showed the compound to have 12.9 percent carbon, 3.65 percent hydrogen, 19.4 percent manganese and 15.1 percent nitrogen.

*Example III*

Five parts of manganese pentacarbonyl chloride and 40 parts of ammonia are charged to a pressure resistant vessel in the same manner as described in Example II. The cooled, sealed vessel is allowed to come to room temperature (about 30° C.) whereupon a pressure of 169 p.s.i.g. is achieved. The temperature and pressure are maintained for 1 hour whereupon the vessel is vented and the existing ammonia allowed to evaporate. The residue is extracted with acetone and the acetone extract evaporated to give a good yield of diammonia manganese tricarbonyl chloride having the formula $$(NH_3)_2Mn(CO)_3Cl$$

*Example IV*

The procedure of Example II is repeated employing 50 parts of ammonia and 6 parts of manganese pentacarbonyl iodide. The pressure resistant vessel is heated to 70° C. to give a pressure of 480 p.s.i.g. and these conditions are maintained for 1 hour. Triammonia manganese tricarbonyl iodide in good yield results.

*Example V*

Manganese pentacarbonyl chloride (5 parts), 16 parts of carbon tetrachloride as a solvent and 2 parts of liquid ammonia are admixed at —40° C. The mixture is gradually allowed to come to room temperature and the existing ammonia is thereby evaporated. The carbon tetrachloride solvent is removed by distillation and the residue is treated as in Example I to give a good yield of ammonia manganese tetracarbonyl chloride.

*Example VI*

Following the procedure of Example II, 6 parts of manganese pentacarbonyl iodide, 10 parts of ammonia and 50 parts of benzene are admixed in a pressure resistant vessel at —50° C. The vessel is sealed and the temperature gradually elevated to about 130° C. This temperature is maintained for 1 hour whereupon the ammonia pressure is vented and the benzene layer removed. Triammonia manganese tricarbonyl iodide in good yield results.

*Example VII*

Example II is repeated at 100° C. and about 900 p.s.i.g. to give a good yield of $(NH_3)_3Mn(CO)_3I$ by employing $Mn(CO)_5$ as a starting material.

As indicated above the process of this invention is applicable to manganese pentacarbonyl halides including manganese pentacarbonyl iodide, manganese pentacarbonyl bromide and manganese pentacarbonyl chloride. The manganese pentacarbonyl bromide is preferred for laboratory preparation of the compounds of this invention since it is readily prepared from manganese carbonyl and bromine which is available for laboratory use as a liquid. However, for large scale operations it is often convenient to employ manganese pentacarbonyl chloride as a starting material in the process of this invention.

When the compounds of this invention are ionic they may be isolated from solution as compounds containing the ammonia manganese carbonyl ion with any desired anion by ordinary salting-out techniques. Thus ammonia manganese tetracarbonyl iodide may be obtained from a solution of ammonia manganese tetracarbonyl bromide by precipitation with excess potassium iodide.

The temperatures and pressures employed in the process of this invention depend to a great extent on the nature of the desired product. Thus when a manganese pentacarbonyl halide is reacted with ammonia at atmospheric pressure and temperature above the evaporation temperature of liquid ammonia, ammonia manganese tetracarbonyl halides are produced. When higher temperatures and pressures are employed, the ammonia manganese tricarbonyl halides result. Temperatures up to somewhat below the critical temperature of ammonia may be employed at the prevailing pressure of the system. Thus temperatures as high as 130° C. and consequent pressures of up to about 1500 p.s.i.g. give good results. However, a preferred range of temperature is from —33° C. to about 100° C. at pressures ranging from atmospheric to about 900 p.s.i.g., as these conditions give excellent yields of product and may be realized in available equipment.

Although it is preferable to conduct the process of this invention in the absence of a solvent good results are also obtained when a solvent such as an inert hydrocarbon, either aromatic or aliphatic, a halo hydrocarbon or a lower alkyl alcohol, is employed. Examples of such suitable solvents include carbon tetrachloride, chloroform, hexane, bromo benzene, benzene, toluene, 2-6-dimethyl heptane, ethylbenzene, methanol, ethanol, 2-methyl butanol, n-pentanol; and the like.

The novel compounds of this invention are extremely useful as intermediates in the preparation of cyclopentadienyl manganese tricarbonyl compounds. When the ammonia manganese carbonyl halide compound is reacted with an alkali metal cyclopentadienide an excellent yield of cyclopentadienyl manganese tricarbonyl compounds result. This is illustrated by the following example.

*Example VIII*

Thirty-one parts of a 50 percent dispersion of sodium in light mineral oil are added to 2150 parts of freshly distilled tertiary-butanol containing 50 parts of freshly distilled methylcyclopentadiene. To this mixture is added 206 parts of ammonia manganese tetracarbonyl iodide. The reaction mixture is refluxed at about 83° C. for about 5 hours. The alcohol solvent is removed under reduced pressure and the residue distilled. An excellent yield of methylcyclopentadienyl manganese tricarbonyl results. This compound has a freezing point of about 15° C. and boiling point of 112° C. at 15 mm. of mercury.

In a similar manner, cyclopentadienyl manganese tricarbonyl is prepared by the reaction of diammonia manganese tetracarbonyl bromide with lithium cyclopentadienide while ethylcyclopentadienyl manganese tricarbonyl is produced by the reaction of ethylcyclopentadienyl potassium and triammonia manganese tricarbonyl chloride. Other cyclopentadienyl manganese tricarbonyl compounds are similarly prepared from the corresponding alkali metal cyclopentadienide and an ammonia manganese carbonyl halide of this invention.

The cyclopentadienyl manganese tricarbonyl compounds prepared from the compounds of this invention are outstanding antiknock agents when added to liquid hydrocarbon fuels of the gasoline boiling range. For example, when methylcyclopentadienyl manganese tricarbonyl was added to a commercial gasoline having an initial boiling point of 94° F. and a final boiling point of 390° F. in amount sufficient to prepare a composition containing 1 gram of manganese per gallon, the octane number of the gasoline was raised from 83.1 to 92.3 as determined by the research method. The research method of determining the octane number of a fuel is generally accepted as a method of test which gives a good indication of fuel behavior in full-scale automotive engines under normal driving conditions and the method most used by commercial installation in determining the value of a gasoline or additive. The research method of testing anti-knocks is conducted in a single-cylinder engine especially designed for this purpose and referred to as the CFR engine. This engine has a variable compression ratio and during the test the temperature of the jacket water is maintained at 212° F. and the inlet air temperature is controlled at 125° F. The engine is operated at a speed of 600 r.p.m. with a spark advance of 13° before top dead center. The test method employed is more fully described in test procedure D–908–55 contained in the 1956 edition of "ASTM Manual of Engine Test Methods for Rating Fuels."

The above is merely illustrative of the antiknock effect realized by the use of a cyclopentadienyl manganese tricarbonyl compound. Good results are also obtained when other compounds prepared by the process of this invention, such as cyclopentadienyl manganese tricarbonyl, ethylcyclopentadienyl manganese tricarbonyl, indenyl manganese tricarbonyl and the like are employed in gasolines.

The ammonia manganese carbonyl halide compounds of this invention may be incorporated in paints, varnish, printing inks, synthetic resins of the drying oil type, oil enamels and the like, to impart excellent drying of such compositions. Generally speaking, from 0.01 to 0.05 percent of manganese as a compound of this invention is beneficially employed as a dryer in such a composition.

For example, to a typical varnish composition containing 100 parts ester gum, 173 parts of tung oil, 23 parts of linseed oil and 275 parts of white petroleum naphtha is added 2.5 parts of triammonia manganese tricarbonyl bromide. The resulting varnish composition is found to have excellent drying characteristics. Equally good results are obtained when other drying oil compositions and other triammonia manganese carbonyl halide compounds of this invention are employed.

We claim:
1. A compound having the formula $(NH_3)_aMn(CO)_bX$ wherein $a$ is a small integer ranging from 1 to 3, $b$ is a small integer ranging from 3 to 4 such that the total of $a$ plus $b$ is from 5 to 6 and X represents halogen having an atomic number of at least 17.
2. An ammonia manganese tetracarbonyl halide compound wherein the halogen has an atomic number of at least 17.
3. Ammonia manganese tetracarbonyl bromide having the formula $NH_3Mn(CO)_4Br$.
4. Triammonia manganese tetracarbonyl bromide.
5. Process for the preparation of an ammonia manganese carbonyl halide compound which comprises reacting ammonia with a manganese pentacarbonyl halide wherein the halogen has an atomic number of at least 17.
6. Process for the preparation of an ammonia manganese tetracarbonyl halide which comprises contacting manganese pentacarbonyl halide wherein the halogen has an atomic number of at least 17 with liquid ammonia at atmospheric pressure and subsequently warming the mixture to above the boiling point of ammonia.

References Cited in the file of this patent

W. Hieber: Inorganic Chemistry, part II, published as a part of FIAT Review of German Science, 1939–1946, under the Office of Military Government for Germany, Field Information Agencies Technical, 1948, part II, pages 108–145, pages 127–128 relied on.

"Neuartige Kohlenoxydverbindungen von Eisenhalogeniden und ihre Chemische Charakterisierung," by Von Walter Hieber et al., Zeitschrift für anorganische und allgemeine Chemie, Band 190, pp 193–214 (1930).

"Preparation and Properties of Manganese Carbonyl," by Brimm et al., J.A.C.S., vol. 76, pp. 3831–35 (1954).